(12) United States Patent
Fagan et al.

(10) Patent No.: US 12,110,811 B1
(45) Date of Patent: Oct. 8, 2024

(54) GAS TURBINE ARCHITECTURE INTEGRATING A WORKING FLUID CYCLE

(71) Applicant: University of Notre Dame du Lac, South Bend, IN (US)

(72) Inventors: John R. Fagan, Indianapolis, IN (US); Joshua D. Cameron, Granger, IN (US); Scott C. Morris, Elkhart, IN (US)

(73) Assignee: University of Notre Dame du Lac, South Bend, IN (US)

( * ) Notice: Subject to any disclaimer, the term of this patent is extended or adjusted under 35 U.S.C. 154(b) by 0 days.

(21) Appl. No.: 17/957,379

(22) Filed: Sep. 30, 2022

Related U.S. Application Data

(60) Provisional application No. 63/253,175, filed on Oct. 7, 2021.

(51) Int. Cl.
*F01K 25/10* (2006.01)
*F01K 23/10* (2006.01)
*F02C 1/10* (2006.01)
*F01K 7/32* (2006.01)
*F02C 7/18* (2006.01)

(52) U.S. Cl.
CPC ............ *F01K 25/103* (2013.01); *F01K 23/10* (2013.01); *F02C 1/10* (2013.01); *F01K 7/32* (2013.01); *F02C 7/185* (2013.01); *F05D 2220/76* (2013.01); *F05D 2260/205* (2013.01); *F05D 2260/213* (2013.01)

(58) Field of Classification Search
None
See application file for complete search history.

(56) References Cited

U.S. PATENT DOCUMENTS

2018/0050810 A1* 2/2018 Niergarth .............. F04D 29/056
2018/0313232 A1* 11/2018 Auciello ................. F04B 35/00
2022/0275752 A1* 9/2022 Holley .................... F01K 23/02

* cited by examiner

*Primary Examiner* — Gerald L Sung
*Assistant Examiner* — Alyson Joan Harrington
(74) *Attorney, Agent, or Firm* — ICE MILLER LLP

(57) ABSTRACT

A gas turbine engine with a closed loop working fluid cycle.

20 Claims, 6 Drawing Sheets

GAS TURBINE ARCHITECTURE INTEGRATING A WORKING FLUID CYCLE

RELATED APPLICATION

This patent application is related to and claims the priority benefit of U.S. Patent Application No. 63/253,175, filed Oct. 7, 2021, the disclosure of which is incorporated herein by reference.

BACKGROUND

Commercial and military aircraft are predominantly powered by gas turbine engines. Most conventional gas turbine engines, widely used for propulsion-based mobility applications (aircraft, ground vehicles, or marine vehicles), operate so that air is taken from the atmosphere, compressed, fed into a combustion chamber where fuel is added and burned, expanded in a turbine where work is extracted, and often accelerated through a nozzle to produce thrust. While significant improvement in gas turbine engine efficiency and power to weight have occurred over the past decades, the maturity of the relevant technologies with the standard architecture suggests that there is limited opportunity for major future improvements. Alternative propulsion technologies are regularly proposed, but no technology has been identified to rival the capabilities of the gas turbine engine. However, modern gas turbine engines have thermodynamic efficiencies of less than 50%. For a modern single-aisle commercial aircraft, as much as 25 MW of power generated by burning fuel is rejected to the environment as waste heat. In addition, this heat load drives the need for exotic materials and efficiency-reducing cooling flows in the engine hot section.

While conventional gas turbine engines are well accepted, there is always a goal to improve fuel efficiency/burn rate, reduce weight and reduce cost, which are among the most important factors for customers. There is also significant interest in electric propulsion systems that do not burn hydrocarbon fuels in-situ. However, electric propulsion systems are unlikely to be commercially feasible for some time.

For the foregoing reasons, it is desired to provide a thermal system and engine architecture that can provide fuel burn, weight, and cost reduction.

SUMMARY

The present disclosure includes disclosure of gas turbine engines comprising closed loop working fluid cycles. In at least one embodiment, such a gas turbine engine comprises an air-breathing compressor, the air-breathing compressor comprising an inlet to receive air from an environment, the air comprising an air pressure, the air-breathing compressor configured to increase the air pressure and to expel the air at the increased air pressure; a combustion chamber in fluid communication with the air-breathing compressor, the combustion chamber arranged to receive the air at the increased air pressure from the air-breathing compressor, and configured to ignite a fuel in the presence of the air causing an exothermic reaction releasing gaseous products, and configured to direct the gaseous products of the exothermic reaction toward an air turbine, the air turbine being in fluid communication with the combustion chamber, the air turbine being rotatably driven by the gaseous products of the exothermic reaction passing through the air turbine, the air turbine being configured to direct the gaseous products of the exothermic reaction toward a heat exchanger in fluid communication with the air turbine; and a closed loop working fluid system containing a working fluid, the closed loop working fluid system comprising a working fluid turbine, a cold sink, a working fluid compressor, and the heat exchanger, the working fluid turbine being in fluid communication with the cold sink, the cold sink being in fluid communication with the working fluid compressor, the working fluid compressor being in fluid communication with the heat exchanger, the heat exchanger being in fluid communication with the working fluid turbine, the working fluid compressor being coupled to the air turbine, and the working fluid turbine being coupled to the air-breathing compressor.

In at least one embodiment of a gas turbine engine according to the present disclosure, power transmission between the air turbine and the compressor is accomplished by a closed loop working fluid system.

In at least one embodiment of a gas turbine engine according to the present disclosure, power transmission between the air turbine and the compressor is accomplished without a shaft connecting the air turbine and the compressor.

In at least one embodiment of a gas turbine engine according to the present disclosure, the working fluid is supercritical carbon dioxide. In at least one embodiment of a gas turbine engine according to the present disclosure, the working fluid is transcritical carbon dioxide.

In at least one embodiment, a gas turbine engine according to the present disclosure comprises an electric generator coupled to the air turbine. In an aspect of such an embodiment, an electric motor is electrically coupled to the electric generator. In an aspect of such an embodiment, a propulsor is electrically coupled to the electric motor. In an aspect of such an embodiment, electricity from the electric motor drives the propulsor, and the propulsor is configured to propel a structure into which the propulsor has been installed. In an aspect of such an embodiment, the structure is an aircraft. In an aspect of such an embodiment, the propulsor is located remotely from the air turbine.

In at least one embodiment of a gas turbine engine according to the present disclosure, such a gas turbine engine comprises an air-breathing compressor, the air-breathing compressor comprising an inlet to receive air from an environment, the air comprising an air pressure, the air-breathing compressor configured to increase the air pressure and to expel the air at the increased air pressure; a combustion chamber in fluid communication with the air-breathing compressor, the combustion chamber arranged to receive the air at the increased air pressure from the air-breathing compressor, and configured to ignite a fuel in the presence of the air causing an exothermic reaction releasing gaseous products, and configured to direct the gaseous products of the exothermic reaction toward an air turbine, the air turbine being in fluid communication with the combustion chamber, the air turbine being rotatably driven by the gaseous products of the exothermic reaction passing through the air turbine, the air turbine being configured to direct the gaseous products of the exothermic reaction toward a heat exchanger in fluid communication with the air turbine; and a closed loop working fluid system containing a working fluid, the closed loop working fluid system comprising a first working fluid turbine, a second working fluid turbine, a cold sink, a working fluid compressor, and the heat exchanger, the first working fluid turbine being in fluid communication with the cold sink, the cold sink being in fluid communication with the working fluid compressor, the working fluid compressor being in fluid communication with the heat exchanger and with the second working fluid turbine, the heat exchanger being in fluid communication with the first working fluid turbine, the second working fluid turbine being in fluid communication with the cold sink; the first working fluid compressor being coupled to the air turbine, and the working fluid turbine being coupled to the air-breathing compressor. In an aspect of such an embodiment, a propulsor is coupled to the second working fluid turbine. In an aspect of such an embodiment, the working fluid moving through the second working fluid turbine drives the propulsor, and the propulsor is configured to propel a structure into which the propulsor has been installed. In an aspect of such an embodiment, the structure is an aircraft. In an aspect of such an embodiment, the propulsor is located remotely from the air turbine.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION

Figure 1:
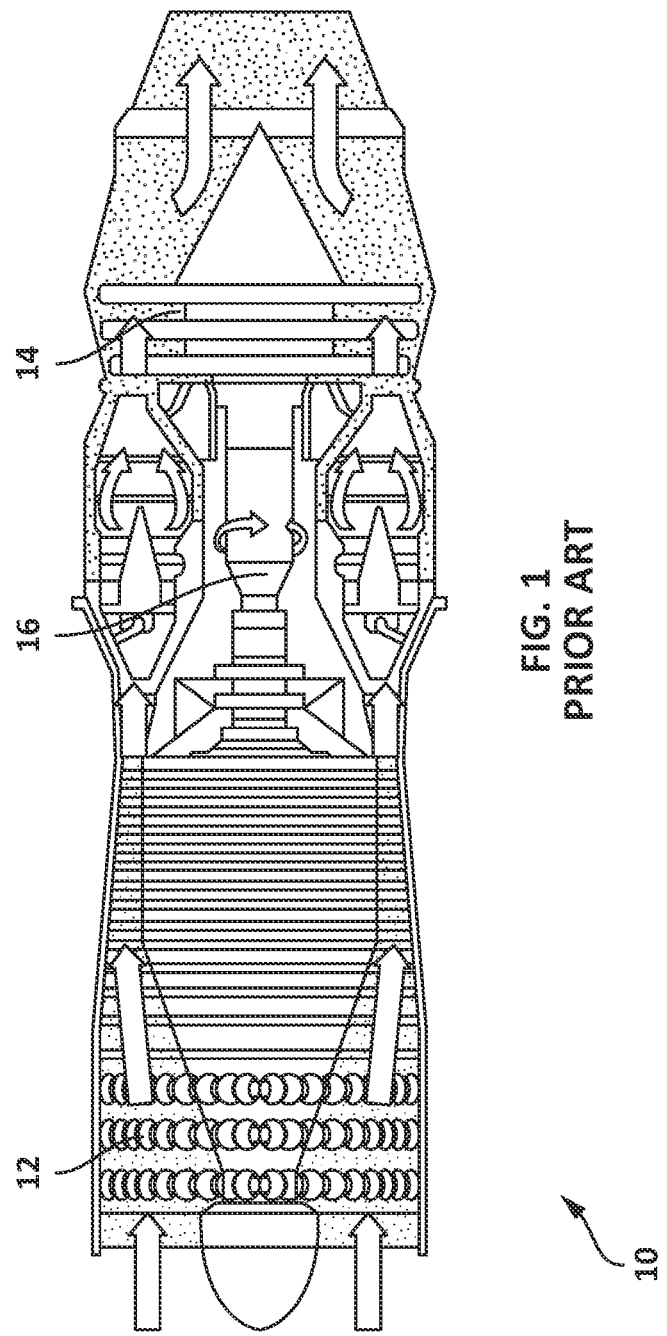
FIG. 1 shows a cross-sectional view of a gas turbine engine according to the prior art.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment, and should not be interpreted as defining or limiting the range of values or properties encompassed by example embodiments.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

The present disclosure includes disclosure of at least one embodiment of a gas turbine architecture integrating a conventional air-breathing cycle for propulsion and a closed loop cycle for power distribution plus thermal management and waste heat recovery employing a working fluid, such as, but not limited to supercritical carbon dioxide ("sCO2"). In an embodiment of a gas turbine engine according to the present disclosure, a different working fluid, such as but not limited to transcritical carbon dioxide or helium, may be used instead of sCO2. At least one embodiment of a gas turbine according to the present disclosure may deliver cycle efficiency improvement and weight reduction by allowing higher operating temperature and pressure ratios, and may recover energy from waste heat in the exhaust as well as from high temperature components. At least one embodiment may deliver weight and cost benefits, as well as cycle efficiency improvement by reducing the required compressor stage count requirements. At least one embodiment of a gas turbine according to the present disclosure may deliver component efficiency improvement by allowing the air-breathing components to operate independently at their optimized rotational speeds, deliver weight and cost reduction by simplifying and modularizing the engine architecture, and may be integrated with the aircraft systems for thermal management to provide additional performance benefits.

FIG. 1 shows a cross-sectional view of a gas turbine engine 10 according to the prior art, illustrating the intake, compression, combustion, and exhaust areas of such a prior art gas turbine engine. As illustrated in FIG. 1, air-breathing compressor 12 is connected to turbine 14 by a shaft 16.

At least one embodiment of a gas turbine according to the present disclosure may use a working fluid such as sCO2 in a closed loop cycle as a heat sink for the hot section components of the gas turbine engine power producing cycle, and for power transmission between the turbine and the compression system components of the gas turbine engine power producing cycle, thus eliminating the shaft connection characteristic of prior art gas turbine engines.

Figure 2:
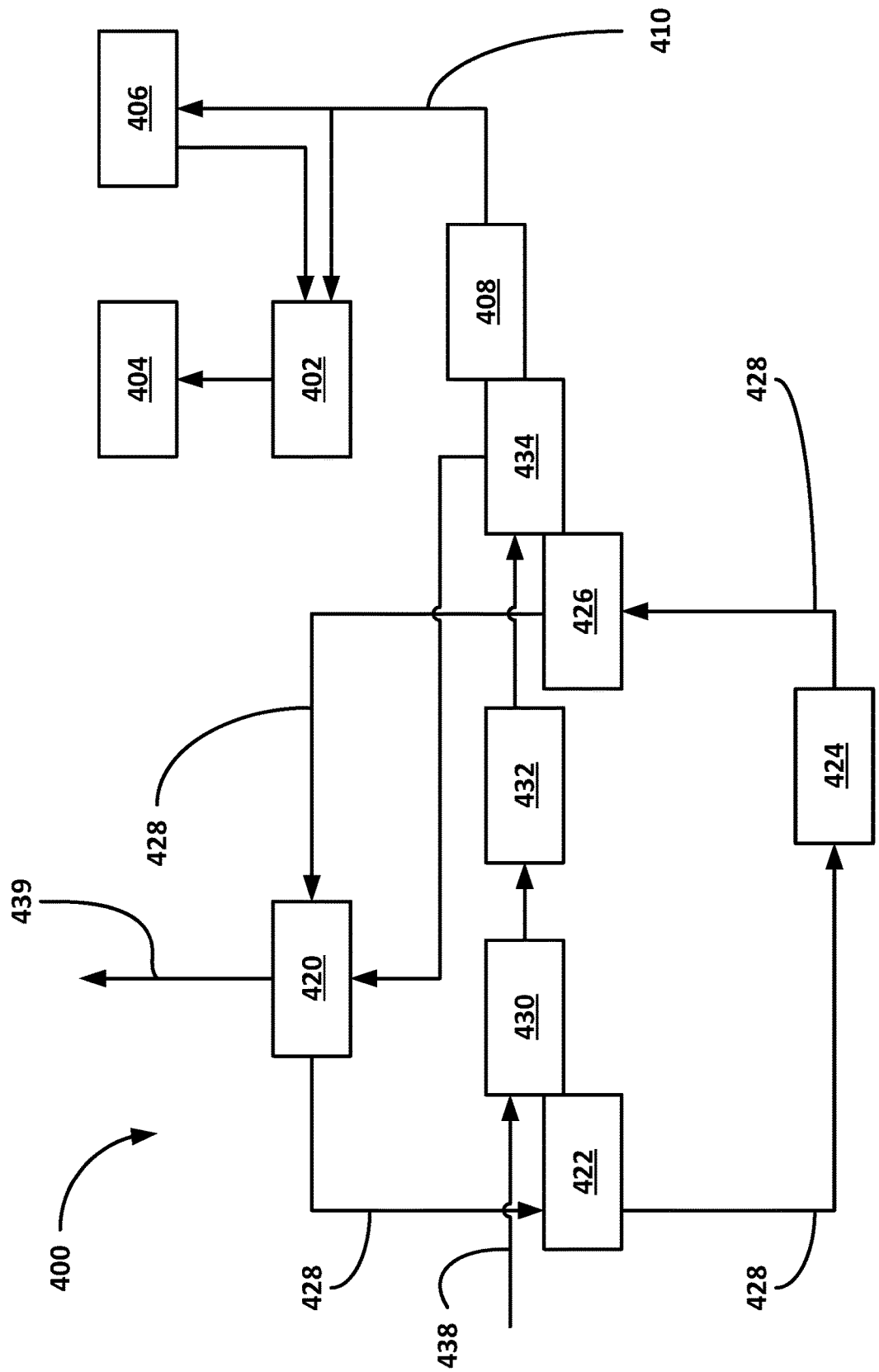
FIG. 2 shows a block diagram of integrated thermal aero-propulsion (ITAP) cycle architecture in a gas turbine engine according to at least one embodiment of the present disclosure.

FIG. 2 shows a block diagram of integrated thermal aero-propulsion (ITAP) cycle architecture 400 in a gas turbine engine according to at least one embodiment of the present disclosure. As shown FIG. 2, air enters at air inlet 438, is compressed by air-breathing compressor 430 increasing the pressure of the air. The pressurized air then moves to combustion chamber 432 where fuel is added and ignited. The exhaust from combustion chamber 432 drives air turbine 434, then passes through heat exchanger 420 before being expelled through outlet 439. Air inlet 438 is in fluid communication with air-breathing compressor 430. Air-breathing compressor 430 is in fluid communication with combustion chamber 432. Combustion chamber 432 is in fluid communication with air turbine 434. Air turbine 434 is in fluid communication with heat exchanger 420. Heat exchanger 420 is in fluid communication with outlet 439.

Also shown in FIG. 2 is working fluid loop 428 according to at least one embodiment of the present disclosure. As shown in FIG. 2, working fluid loop 428 is a closed loop system comprising working fluid turbine 422, cold sink 424, working fluid compressor 426, and heat exchanger 420, with working fluid turbine 422 being in fluid communication with cold sink 424, cold sink 424 being in fluid communication with working fluid compressor 426, working fluid compressor 426 being in fluid communication with heat exchanger 420, and heat exchanger 420 being in fluid communication with working fluid turbine 422.

Air turbine 434 is coupled to working fluid compressor 426. Concurrent with the combustion cycle described above, the rotation of air turbine 434 drives working fluid compressor 426, which motivates the working fluid in working fluid loop 428 toward heat exchanger 420. The working fluid in working fluid loop 428 absorbs heat from the exhaust from combustion chamber 432 at heat exchanger 420 and continues along working fluid loop 428 through working fluid turbine 422, and cold sink 424, eventually returning to working fluid compressor 426. The movement of working fluid through working fluid turbine 422 causes rotation within working fluid turbine 422. Working fluid turbine 422 is coupled to air-breathing compressor 430. The rotation of working fluid turbine 422 drives the air-breathing compressor 430, which in turn increases the pressure of the air received through air inlet 438.

Also shown in FIG. 2 is electrical system 410, comprising motor 402, propulsor 404, battery 406, and generator 408. According to at least one embodiment of the present disclosure, air turbine 434 is coupled to generator 408. In such an embodiment, the rotation of air turbine 434 drives generator 408, thereby generating electricity. Electricity from generator 408 powers electric motor 402 and/or charges battery 406. According to at least one embodiment of the present disclosure, electric motor 402 is electrically connected to propulsor 404. Electricity from electric motor 402 drives propulsor 404, which may cause propulsor 404 to propel a structure into which a gas turbine engine comprising the ITAP cycle architecture 400 has been installed, such as but not limited to an aircraft. According to at least one embodiment of the present disclosure, the configuration shown in FIG. 2 may use a working fluid loop 428 for hot section heat sink and/or for the power transmission between the single turbine and air-breathing compressor, replacing the shaft that is customary in prior art gas turbine engines.

Figure 3:
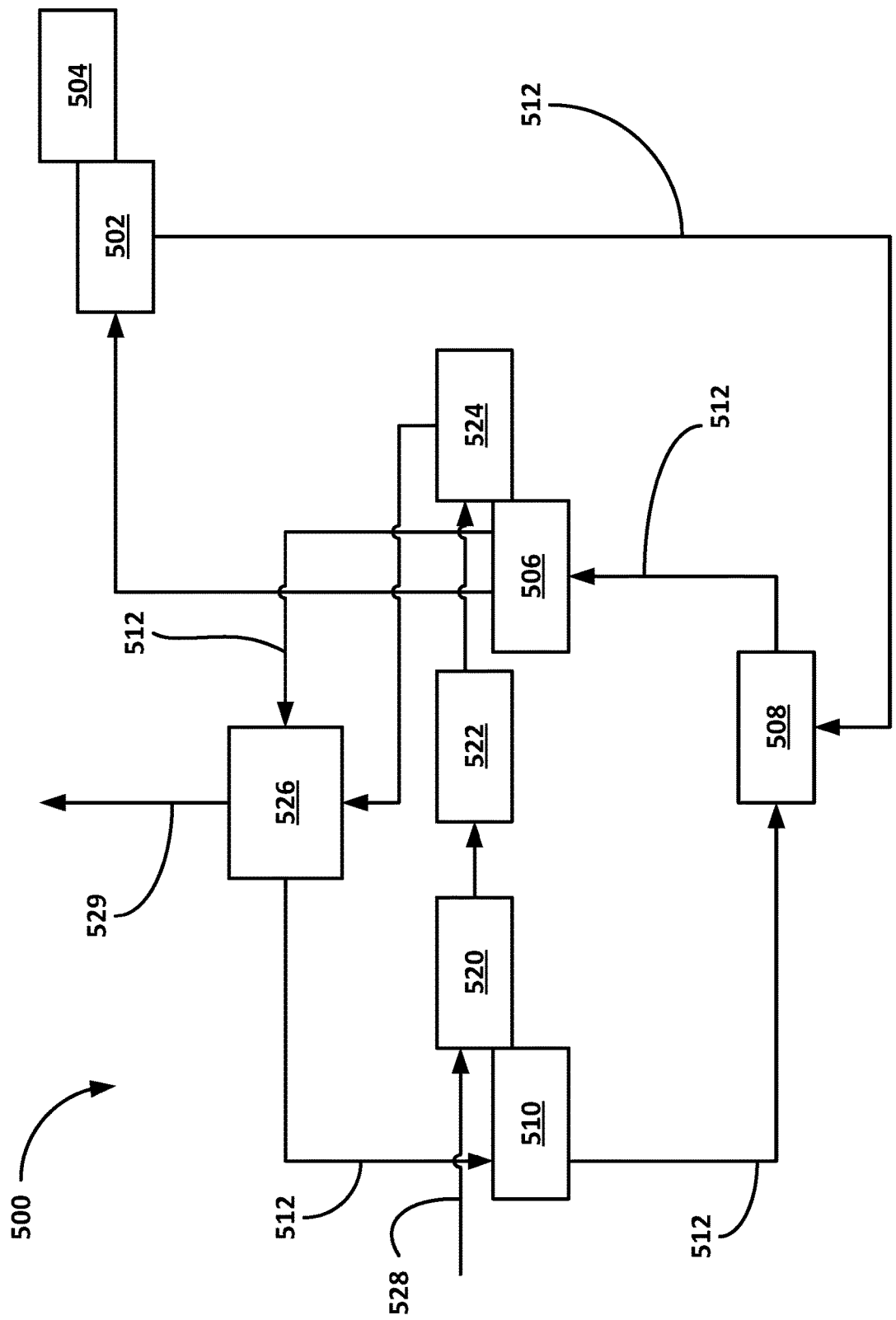
FIG. 3 shows a block diagram of integrated thermal aero-propulsion (ITAP) cycle architecture in a gas turbine engine according to at least one embodiment of the present disclosure.

FIG. 3 shows a block diagram of integrated thermal aero-propulsion (ITAP) cycle architecture 500 in a gas turbine engine according at least one embodiment of the present disclosure. As shown FIG. 3, air enters at air inlet 528, is compressed by air-breathing compressor 520 increasing its pressure, and then moves to combustion chamber 522 where fuel is added and ignited. The exhaust from combustion chamber 522 drives air turbine 524, then passes through heat exchanger 526 before being expelled through outlet 529. Air inlet 528 is in fluid communication with air-breathing compressor 520. Air-breathing compressor 520 is in fluid communication with combustion chamber 522. Combustion chamber 522 is in fluid communication with air turbine 524. Air turbine 524 is in fluid communication with heat exchanger 526. Heat exchanger 526 is in fluid communication with outlet 529.

Also shown in FIG. 3 is working fluid loop 512 according to at least one embodiment of the present disclosure. As shown in FIG. 3, working fluid loop 512 is a closed loop system comprising working fluid turbine 502, working fluid compressor 506, cold sink 508, working fluid turbine 510, and heat exchanger 526, with working fluid turbine 510 being in fluid communication with cold sink 508, cold sink 508 being in fluid communication with working fluid compressor 506, working fluid compressor 506 being in fluid communication with heat exchanger 526 and with working fluid turbine 502, heat exchanger 526 being in fluid communication with working fluid turbine 510, and working fluid turbine 502 being in fluid communication with heat sink 508.

Air turbine 524 is coupled to working fluid compressor 506. Concurrent with the combustion cycle described above, the rotation of air turbine 524 drives working fluid compressor 506, which motivates the working fluid in working fluid loop 512 toward heat exchanger 526 and concurrently motivates the working fluid in working fluid loop 512 toward working fluid turbine 502. The working fluid in working fluid loop 512 that is routed toward heat exchanger 526 absorbs heat from the exhaust from combustion chamber 524 at heat exchanger 526 and continues along working fluid loop 512 through working fluid turbine 510, and cold sink 508, eventually returning to working fluid compressor 506. The working fluid in working fluid loop 512 that is routed toward working fluid turbine 502 motivates working fluid turbine 502, then continues to cold sink 508, eventually returning to working fluid compressor 506.

The movement of working fluid through working fluid turbine 510 causes rotation within working fluid turbine 510. Working fluid turbine 510 is coupled to air-breathing compressor 520. The rotation of working fluid turbine 510 drives the air-breathing compressor 520, which in turn increases the pressure of the air received through air inlet 528. The movement of working fluid through working fluid turbine 502 causes rotation within working fluid turbine 502. Working fluid turbine 502 is coupled to propulsor 504. The rotation of working fluid turbine 502 drives propulsor 504, which may cause propulsor 504 to propel a structure into which a gas turbine engine comprising the ITAP cycle architecture 500 has been installed, such as but not limited to an aircraft. According to at least one embodiment of the present disclosure, the configuration shown on FIG. 3 may use a working fluid loop 512 for hot section heat sink and/or for the power transmission between the single turbine and air-breathing compressor, replacing the shaft that is a feature of prior art gas turbine engines.

Figure 4:
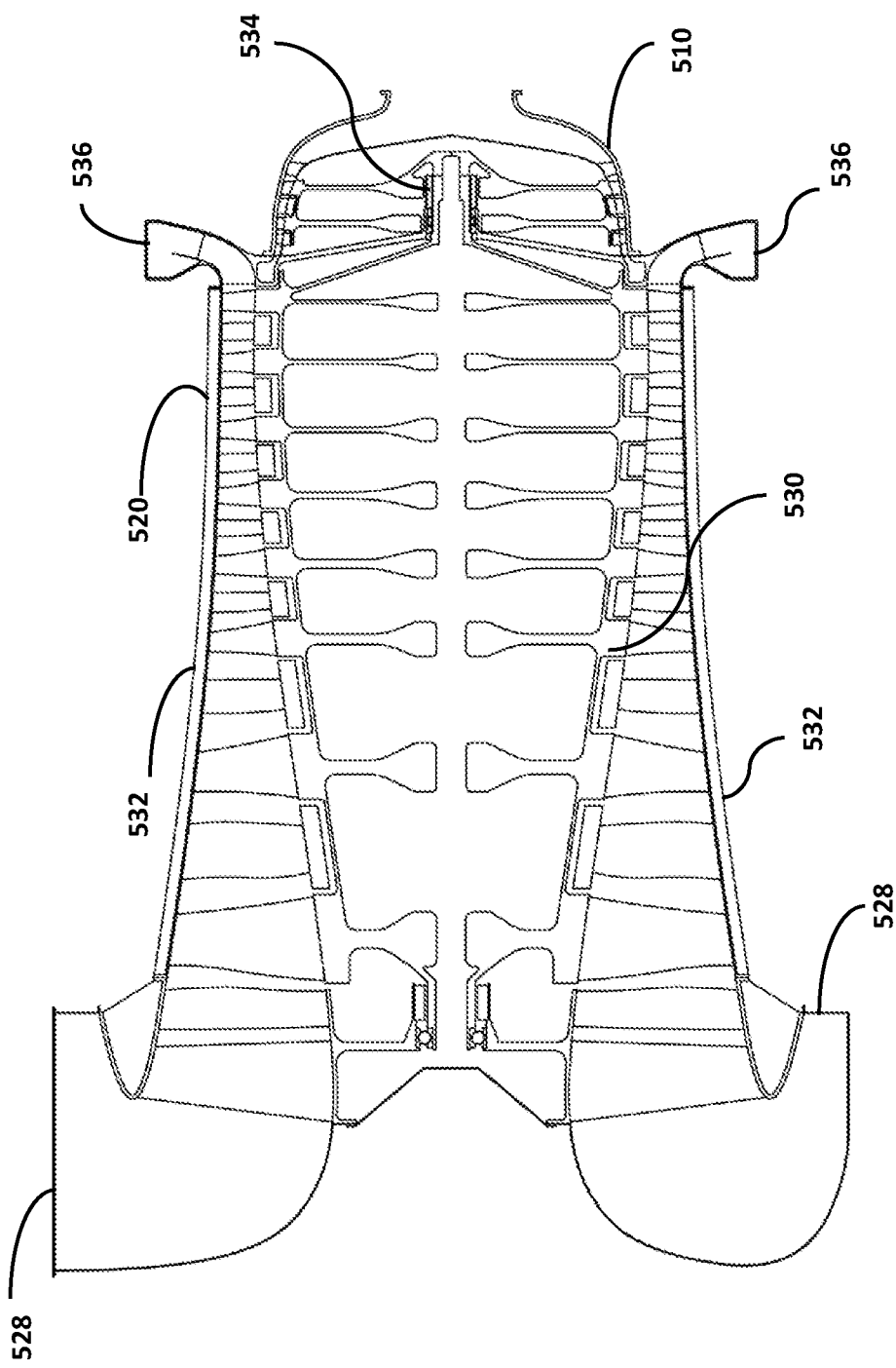
FIG. 4 shows a conceptual cross-sectional view of an air compressor coupled to a working fluid turbine as part of a gas turbine engine according to at least one embodiment of the present disclosure.

FIG. 4 shows a conceptual cross-sectional view of an air compressor coupled to a working fluid turbine as part of a gas turbine engine according to at least one embodiment of the present disclosure. As illustrated in FIG. 4, such an embodiment may comprise air-breathing compressor 520, which comprises air inlet 528, rotor 530, stator 532, and air outlet 536. As illustrated in FIG. 4, such an embodiment may further comprise working fluid turbine 510, which is coupled to rotor 530 at connection 534. In such an embodiment, a working fluid (not shown) passing through working fluid turbine 510 causes rotation in working fluid turbine 510. The rotation of working fluid turbine 510 thereby rotates rotor 530 to compress the air passing through rotor 530 and stator 532. In such an embodiment, air enters air-breathing compressor 520 at air inlet 528, is compressed by rotor 530 and stator 532, and is discharged from air outlet 536 where it is directed to a combustion chamber.

Figure 5:
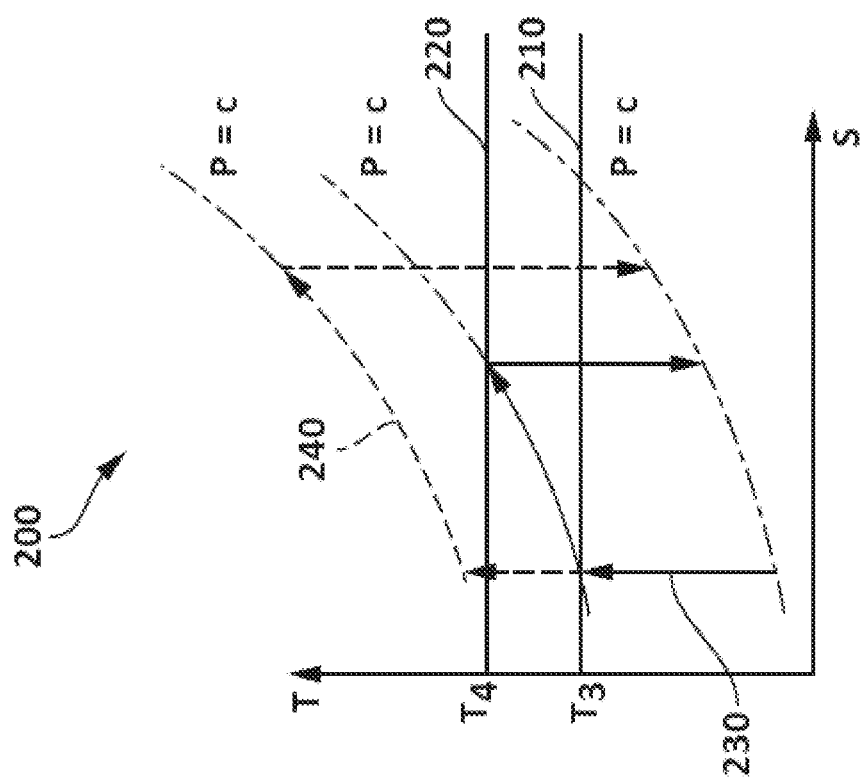
FIG. 5 shows a temperature-entropy plot of a gas turbine engine according to the present disclosure versus a prior art gas turbine engine.

FIG. 5 shows a temperature-entropy plot 200 illustrating the higher efficiency provided by a gas turbine engine according to the present disclosure (shown as dotted line 240) versus a prior art gas turbine engine (shown as solid line 230). The engine cycle efficiency may be increased with a higher cycle pressure ratio, as shown in FIG. 5. A prior art gas turbine engine cycle pressure ratio is limited by the air-breathing compressor exit temperature (T3) 210 and the turbine inlet temperature (T4) 220, as illustrated in FIG. 5. A higher-pressure ratio is enabled by local cooling from the working fluid power and thermal management cycle.

Figure 6:
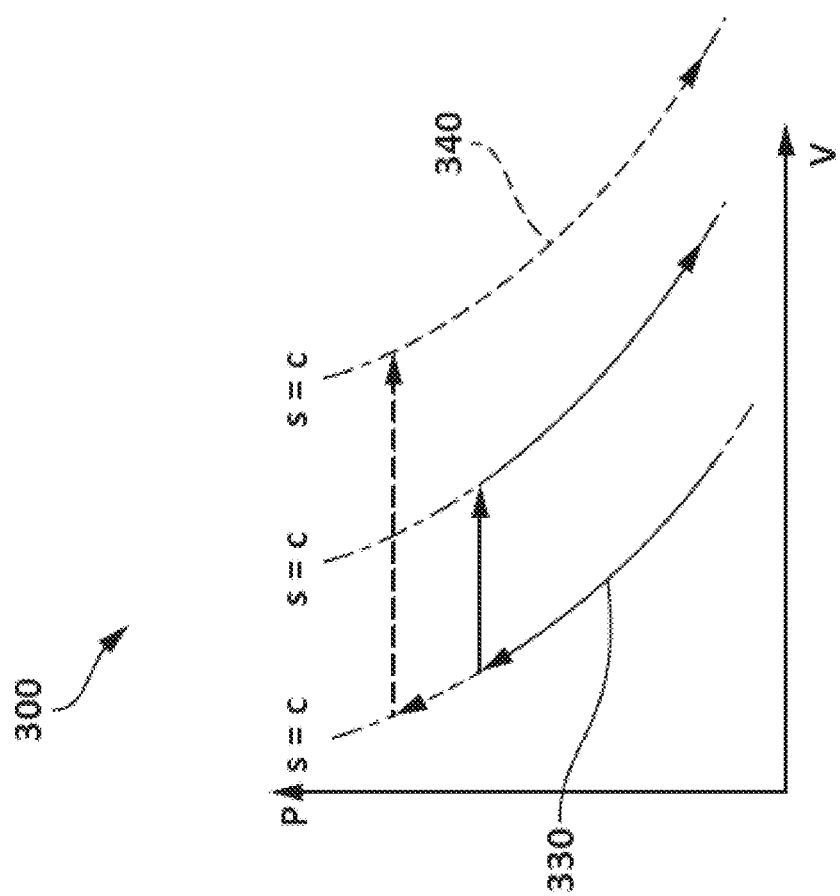
FIG. 6 shows a pressure-volume plot of a gas turbine engine according to the present disclosure versus a prior art gas turbine engine.

FIG. 6 shows a pressure-volume plot 300 illustrating the superior performance provided by a gas turbine engine according to the present disclosure (shown as dotted line 340) versus a prior art gas turbine engine (shown as solid line 330). The specific work produced by each gas turbine cycle is proportional to the area under the PV curve. The required engine airflow and component size in a gas turbine engine according to the present disclosure may be reduced when compared with a prior art gas turbine engine, because of the higher pressure ratio and operating temperature.

An embodiment of a gas turbine engine according to the present disclosure may include various changes from a prior art gas turbine engine, including: an electrically driven propulsor remote from the engine; a working fluid turbine driven propulsor remote from the engine; an air-breathing compressor driven by an integrated working fluid turbine; high pressure ratio operation due to the integrated cooling; high temperature operation due to the integrated cooling; elimination of engine length driveshafts; simplified bearing, shafting, and lube systems; and/or thermal energy recovery from hot exhaust utilizing the working fluid cycle.

An embodiment of a gas turbine engine according to the present disclosure may comprise a single-spool ITAP architecture with a free power turbine for a distributed or non-distributed propulsion engine. For the distributed application, the free power turbine may power a generator for an electric drive system. This configuration may use a working fluid PTMS cycle for hot section heat sink and/or for the power transmission between a single turbine and air-breathing compressor, thus replacing the shaft.

An embodiment of a gas turbine engine according to the present disclosure may comprise a multi-spool ITAP architecture for a distributed or non-distributed propulsion engine. Such an embodiment may use a working fluid PTMS cycle for hot section heat sink and/or for the power transmission between one or more of the turbines and air-breathing compressors, thus replacing one or more of the shafts.

An embodiment of a gas turbine engine according to the present disclosure may comprise a single-spool or a multi-spool ITAP architecture for a distributed or non-distributed propulsion engine. Such an embodiment may use a working fluid PTMS cycle for a hot section heat sink and/or for power transmission between one or more turbines and air-breathing compressors, replacing one or more shafts. The working fluid PTMS cycle may be integrated into the aircraft to provide power and thermal management to aircraft systems.

An embodiment of a gas turbine engine according to the present disclosure may replace the shafting in a conventional gas turbine engine with a working fluid power and thermal management loop to transmit power from an air-breathing turbine to an air-breathing compressor, thus providing significant fuel burn, weight, and cost reduction.

An embodiment of a gas turbine engine according to the present disclosure may improve a conventional gas turbine cycle, by modifying the basic engine architecture and providing thermal management for the rotating components. An embodiment of a gas turbine engine according to the present disclosure may be appropriate for any distributed propulsion mobility application, including air, ground, and marine vehicles.

In an embodiment of a gas turbine engine according to the present disclosure, the working fluid components may run cooler than the gas turbine components and may be able to recover energy from waste heat in the exhaust of the gas turbine/air cycle, as well as from high temperature components of the gas turbine. In particular, this may occur because the working fluid may be heated by the air cycle exhaust at a heat exchanger. The working fluid may then be expanded at the working fluid turbine to generate energy that may help drive the air cycle. The working fluid may then be cooled in a cold sink and compressed at the working fluid compressor (that is integrated with the air cycle gas turbine). The working fluid may absorb heat at the working fluid compressor/air cycle turbine, further increasing the efficiency of the system by absorbing heat from the turbine. The working fluid passing through the combustion chamber may further absorb heat from the air cycle. The shafting of a gas turbine engine may be modified to include integrated components of a working fluid loop, which may comprise a working fluid turbine and a working fluid compressor, thereby increasing the efficiency of the gas turbine engine.

In an embodiment of a gas turbine engine according to the present disclosure, the air-breathing compressor and the working fluid turbine may be housed in an integrated rotor or stator assembly. The working fluid flow passage in the rotor may serve as a thermal sink, to manage the air-breathing component temperatures. The air-breathing compressor and turbine may independently operate at their optimal speeds without shafting between them.

An embodiment of a gas turbine engine according to the present disclosure may comprises a turbine of a working fluid cycle being integrated with an air-breathing compressor of a gas turbine engine (i.e., the air cycle components) and a compressor of a working fluid cycle being integrated with an air turbine of a gas turbine engine (i.e., the air cycle components). Shafting or shaft components of a traditional gas turbine engine may be replaced with components that may integrate a turbine and compressor of a working fluid cycle. Because power transmission between an air cycle turbine and air-breathing compressor may be accomplished with a working fluid cycle, an actual shaft connection between the air cycle turbine and air-breathing compressor may be eliminated, simplifying the design and reducing the weight of the system. Replacing the shafting in a conventional gas turbine engine with a working fluid power and thermal management loop to transmit power from the air-breathing turbine to the air-breathing compressor may provide advantages over the prior art including:

Because the working fluid loop operates at a much lower temperature than the air-breathing gas turbine components, it may be used to cool those components, thus enabling a higher temperature (and higher efficiency) thermodynamic cycle. The size of the air breathing components may be significantly reduced to produce the same level of power.

The working fluid loop may recover thermal energy from the air-breathing components and convert it to mechanical energy, thus reducing the air-breathing turbine power required to drive the air-breathing compressor.

The elimination of the hard shaft connection between the air breathing turbine and air-breathing compressor may eliminate the need for a speed match or a gearbox between the air breathing turbine and air-breathing compressor, thus allowing each to be designed optimally for its requirements. This may enable a reduction in the number of turbine stages and potentially the number of compressor stages.

An embodiment of a gas turbine engine according to the present disclosure may eliminate the complex architecture and simplify the shafting, bearing, and lube systems associated with a two or three-shaft gas turbine engine. The innovative configuration of a gas turbine engine according to the present disclosure makes the engine modular and improves manufacturing and maintenance cost.

An embodiment of a gas turbine engine according to the present disclosure may reduce fuel burn by 10% or more.

An embodiment of a gas turbine engine according to the present disclosure may reduce engine weight by 40% (additional aircraft weight reduction may be 5× engine weight reduction).

An embodiment of a gas turbine engine according to the present disclosure may reduce manufacturing and maintenance cost by 30%.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any method disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A gas turbine engine comprising:
    an air-breathing compressor, said air-breathing compressor comprising an inlet to receive air from an environment, said air comprising an air pressure, said air-breathing compressor configured to increase said air pressure and to expel said air at an increased air pressure;
    a combustion chamber in fluid communication with said air-breathing compressor, said combustion chamber arranged to receive said air at said increased air pressure from said air-breathing compressor, and configured to ignite a fuel in the presence of said air causing an exothermic reaction releasing gaseous products, and configured to direct said gaseous products of said exothermic reaction toward an air turbine, said air turbine being in fluid communication with said combustion chamber, said air turbine being rotatably driven by said gaseous products of said exothermic reaction passing through said air turbine, said air turbine being configured to direct said gaseous products of said exothermic reaction toward a heat exchanger in fluid communication with said air turbine; and
    a closed loop working fluid system containing a working fluid, said closed loop working fluid system comprising a working fluid turbine, a cold sink, a working fluid compressor, and said heat exchanger, said working fluid turbine being in fluid communication with said cold sink, said cold sink being in fluid communication with said working fluid compressor, said working fluid compressor being in fluid communication with said heat exchanger, said heat exchanger being in fluid communication with said working fluid turbine, said working fluid compressor being coupled to said air turbine, and said working fluid turbine being coupled to said air-breathing compressor,
    wherein rotation of said air turbine drives rotation of said working fluid compressor by a first mechanical connection, and/or rotation of said working fluid turbine drives rotation of said air-breathing compressor by a second mechanical connection.

2. The gas turbine engine of claim 1, wherein said working fluid is supercritical carbon dioxide.

3. The gas turbine engine of claim 1, wherein said working fluid is transcritical carbon dioxide.

4. The gas turbine engine of claim 1, further comprising:
    an electric generator coupled to said air turbine.

5. The gas turbine engine of claim 4, further comprising:
    an electric motor electrically coupled to said electric generator.

6. The gas turbine engine of claim 5, further comprising:
    a propulsor electrically coupled to said electric motor.

7. The gas turbine engine of claim 6, wherein electricity from said electric motor drives said propulsor, and said propulsor is configured to propel a structure into which said propulsor has been installed.

8. The gas turbine engine of claim 7, wherein said structure is an aircraft.

9. The gas turbine engine of claim 6, wherein said propulsor is located remotely from said air turbine.

10. The gas turbine engine of claim 4, further comprising:
    a battery electrically coupled to said electric generator, wherein said electric generator charges said battery.

11. A gas turbine engine comprising:
    an air-breathing compressor, said air-breathing compressor comprising an inlet to receive air from an environment, said air comprising an air pressure, said air-breathing compressor configured to expel said air at an increased air pressure;
    a combustion chamber in fluid communication with said air-breathing compressor, said combustion chamber arranged to receive said air at said increased air pressure from said air-breathing compressor, and configured to ignite a fuel in the presence of said air causing an exothermic reaction releasing gaseous products, and configured to direct said gaseous products of said exothermic reaction toward an air turbine, said air turbine being in fluid communication with said combustion chamber, said air turbine being rotatably driven by said gaseous products of said exothermic reaction passing through said air turbine, said air turbine being configured to direct said gaseous products of said exothermic reaction toward a heat exchanger in fluid communication with said air turbine; and
    a closed loop working fluid system containing a working fluid, said closed loop working fluid system comprising a working fluid turbine, a cold sink, a working fluid compressor, and said heat exchanger, said working fluid turbine being in fluid communication with said cold sink, said cold sink being in fluid communication with said working fluid compressor, said working fluid compressor being in fluid communication with said heat exchanger, said heat exchanger being in fluid communication with said working fluid turbine, said working fluid compressor being coupled to said air turbine, and said working fluid turbine being coupled to said air-breathing compressor, wherein power transmission between said air turbine and said air-breathing compressor is accomplished without a shaft connecting said air turbine and said air-breathing compressor, and wherein said working fluid turbine is mechanically coupled to said air-breathing compressor, and/or said air turbine is mechanically coupled to said working fluid compressor.

12. The gas turbine engine of claim 11, wherein said working fluid is supercritical carbon dioxide.

13. The gas turbine engine of claim 11, wherein said working fluid is transcritical carbon dioxide.

14. The gas turbine engine of claim 11, further comprising:

an electric generator coupled to said air turbine.

15. The gas turbine engine of claim 14, further comprising:

an electric motor electrically coupled to said electric generator.

16. The gas turbine engine of claim 15, further comprising:

a propulsor electrically coupled to said electric motor.

17. The gas turbine engine of claim 16, wherein electricity from said electric motor drives said propulsor, and said propulsor is configured to propel a structure into which said propulsor has been installed.

18. The gas turbine engine of claim 17, wherein said structure is an aircraft.

19. The gas turbine engine of claim 18, wherein said propulsor is located remotely from said air turbine.

20. The gas turbine engine of claim 14, further comprising:

a battery electrically coupled to said electric generator, wherein said electric generator charges said battery.

* * * * *